(12) United States Patent
Kim et al.

(10) Patent No.: US 12,255,286 B2
(45) Date of Patent: Mar. 18, 2025

(54) ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Seung Kim, Daejeon (KR); Chul Haeng Lee, Daejeon (KR); Yu Ha An, Daejeon (KR); Jeong Woo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 779 days.

(21) Appl. No.: 17/312,587

(22) PCT Filed: Dec. 17, 2019

(86) PCT No.: PCT/KR2019/017890
§ 371 (c)(1),
(2) Date: Jun. 10, 2021

(87) PCT Pub. No.: WO2020/130575
PCT Pub. Date: Jun. 25, 2020

(65) Prior Publication Data
US 2021/0328266 A1    Oct. 21, 2021

(30) Foreign Application Priority Data

Dec. 17, 2018    (KR) ........................ 10-2018-0163440

(51) Int. Cl.
*H01M 10/0567* (2010.01)
*H01M 4/48* (2010.01)
(Continued)

(52) U.S. Cl.
CPC ......... *H01M 10/0567* (2013.01); *H01M 4/48* (2013.01); *H01M 10/0525* (2013.01);
(Continued)

(58) Field of Classification Search
None
See application file for complete search history.

(56) References Cited

U.S. PATENT DOCUMENTS

2002/0025477 A1    2/2002  Itagaki et al.
2004/0229128 A1    11/2004 Noh
(Continued)

FOREIGN PATENT DOCUMENTS

CN    1541206 A    10/2004
CN    106133984 A    11/2016
(Continued)

OTHER PUBLICATIONS

Extended European Search Report for corresponding European Patent Application No. 19901115.6 dated Jan. 4, 2022, 3 pgs.
(Continued)

*Primary Examiner* — Zhongqing Wei
(74) *Attorney, Agent, or Firm* — Lerner David LLP (57) ABSTRACT

An electrolyte solution for a lithium secondary battery and a lithium secondary battery including the same are disclosed herein. In some embodiments, an electrolyte solution includes a lithium salt, an additive including a compound represented by Formula 1, and an organic solvent. In some embodiments, the lithium secondary battery includes a positive electrode, a negative electrode which includes a negative electrode active material containing $SiO_x$ ($0<x\leq2$), a separator, and the electrolyte solution.

7 Claims, 4 Drawing Sheets

(51) Int. Cl.
*H01M 10/0525* (2010.01)
*H01M 10/0568* (2010.01)
*H01M 10/0569* (2010.01)

(52) U.S. Cl.
CPC ... *H01M 10/0568* (2013.01); *H01M 10/0569* (2013.01); *H01M 2300/0028* (2013.01)

(56) References Cited

U.S. PATENT DOCUMENTS

| | | |
|---|---|---|
| 2008/0138703 A1 | 6/2008 | Deguchi et al. |
| 2009/0155695 A1 | 6/2009 | Noh |
| 2012/0077076 A1 | 3/2012 | Cheng et al. |
| 2012/0171183 A1 | 7/2012 | Lahm et al. |
| 2013/0123247 A1 | 5/2013 | Lahm et al. |
| 2016/0255835 A1 | 9/2016 | Lahm et al. |
| 2017/0117588 A1* | 4/2017 | Fujita ............... H01M 10/0568 |
| 2018/0358655 A1 | 12/2018 | Kono et al. |
| 2020/0044287 A1 | 2/2020 | Kim et al. |

FOREIGN PATENT DOCUMENTS

| | | |
|---|---|---|
| CN | 107431248 A | 12/2017 |
| CN | 110574210 A | 12/2019 |
| EP | 1172878 A2 | 1/2002 |
| EP | 3131153 A1 | 2/2017 |
| EP | 3279995 A1 | 2/2018 |
| JP | 2000348759 A | 12/2000 |
| JP | 2003217655 A | 7/2003 |
| JP | 2005347221 A | 12/2005 |
| JP | 2015207392 A | 11/2015 |
| JP | 2016192362 A | 11/2016 |
| JP | 2016192381 A | 11/2016 |
| KR | 20040098164 A | 11/2004 |
| KR | 20080047642 A | 5/2008 |
| KR | 20150049276 A | 5/2015 |
| KR | 20160138402 A | 12/2016 |
| WO | 2006067957 A1 | 6/2006 |

OTHER PUBLICATIONS

International Search Report for Application No. PCT/KR2019/017890, dated Mar. 26, 2020, 3 pages.

* cited by examiner

ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2019/017890, filed on Dec. 17, 2019, which claims priority from Korean Patent Application No. 10-2018-0163440, filed on Dec. 17, 2018, the disclosures of which are incorporated by reference herein.

TECHNICAL FIELD

The present invention relates to an electrolyte solution for a lithium secondary battery and a lithium secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium ion batteries, which are battery systems having high energy density, are in the spotlight, and are currently being used in various devices.

Unlike the early days when lithium metal was directly applied to the system, the lithium ion battery system is being realized as a system in which lithium metal is not directly used in the battery, for example, a transition metal oxide material containing lithium is used as a positive electrode material, and a carbon-based material, such as graphite, and an alloy-based material, such as silicon, are used as a negative electrode material in a negative electrode.

The lithium ion battery is largely composed of a positive electrode formed of a transition metal oxide containing lithium, a negative electrode capable of storing lithium, an electrolyte solution that becomes a medium for transferring lithium ions, and a separator, wherein, with respect to the electrolyte solution among them, a significant amount of research on the electrolyte solution has been conducted while the electrolyte solution is known as a component that greatly affects stability and safety of the battery.

The electrolyte solution for a lithium ion battery is composed of a lithium salt, an organic solvent dissolving the lithium salt, and a functional additive, wherein proper selection of these components is important to improve electrochemical properties of the battery. As a representative lithium salt currently used, $LiPF_6$, $LiBF_4$, LiFSI (lithium bis(fluorosulfonyl) imide, $LiN(SO_2F)_2$), LiTFSI (lithium bis(trifluoromethanesulfonyl) imide, $LiN(SO_2CF_3)_2$), or LiBOB (lithium bis(oxalate) borate, $LiB(C_2O_4)_2$) is being used, and, with respect to the organic solvent, an ester-based organic solvent or ether-based organic solvent is being used.

With respect to the lithium ion battery, an increase in resistance and a decrease in capacity during charge and discharge or storage at high temperatures have been suggested as a serious problem in degradation of performance, and one of causes of the problem suggested is a side reaction caused by deterioration of the electrolyte solution at high temperatures, particularly deterioration due to decomposition of the salt at high temperatures. In a case in which a by-product of the salt is activated and then decomposes films formed on surfaces of the positive electrode and the negative electrode, there is a problem of decreasing passivation ability of the film, and, as a result, this may cause additional decomposition of the electrolyte solution and accompanying self-discharge.

Particularly, with respect to a negative electrode among electrode materials of the lithium ion battery, a graphite-based negative electrode is mostly used, wherein, with respect to graphite, since its operating potential is 0.3 V (vs. $Li/Li^+$) or less which is lower than an electrochemical stabilization window of an electrolyte solution used in the lithium ion battery, the currently used electrolyte solution is reduced and decomposed. The reduced and decomposed product transmits lithium ions, but forms a solid electrolyte interphase (SEI) that suppresses the additional decomposition of the electrolyte solution.

However, in a case in which the SEI does not have sufficient passivation ability to such an extent that it may suppress the additional decomposition of the electrolyte solution, since the electrolyte solution is additionally decomposed during storage, the charged graphite is self-discharged, and as a result, a phenomenon occurs in which a potential of the entire battery is reduced. Thus, in order to maintain the passivation ability of the SEI at high temperatures, it may be an effective solution to introduce an electrolyte solution additive including double or triple bonds which may be reduction-decomposed well, or suppress the damage of the film by removing decomposition products, such as HF and $PF_5$, of $LiPF_6$, as a representative lithium salt, which are generated due to heat/moisture.

As described above, one of factors that may affect the passivation ability is degradation of the film or a surface of the electrode due to HF and $PF_5$ which are produced by pyrolysis of $LiPF_6$, a lithium salt widely used in the lithium ion battery. Due to an acid attack, dissolution of transition metal occurs at the positive electrode to increase resistance, and capacity may be reduced by loss of redox centers. Since the metal ions thus dissolved are electrodeposited on the negative electrode, irreversible capacity is increased by consumption of electrons due to the electrodeposition of the metal and the additional decomposition of the electrolyte, and thus, cell capacity may not only be reduced, but also the resistance may be increased and the graphite negative electrode may be self-discharged.

Therefore, it is urgent to propose and introduce an additive capable of eliminating a cause of the degradation of the battery at high temperatures by removing HF and $PF_5$ which may be generated by the decomposition of the salt.

Prior Art Document: Japanese Patent Application Laid-open Publication No. 2003-217655

DISCLOSURE OF THE INVENTION

Technical Problem

An aspect of the present invention provides an electrolyte solution for a lithium secondary battery which may suppress a side reaction caused by a by-product generated when a lithium salt is decomposed at high temperature.

Another aspect of the present invention provides a lithium secondary battery in which high-temperature characteristics are improved by including the electrolyte solution for a lithium secondary battery.

Technical Solution

According to an aspect of the present invention, there is provided an electrolyte solution for a lithium secondary battery which includes: a lithium salt, an additive including a compound represented by the following Formula 1, and an organic solvent.

[Formula 1]

In Formula 1, R is a substituted or unsubstituted alkylene group having 1 to 5 carbon atoms, and A is a substituted or unsubstituted nitrogen atom-containing heteroaryl group having 3 to 7 carbon atoms.

According to another aspect of the present invention, there is provided a lithium secondary battery including a positive electrode; a negative electrode which includes a negative electrode active material containing $SiO_x$ ($0<x\leq2$); a separator; and the electrolyte solution for a lithium secondary battery.

Advantageous Effects

A compound represented by Formula 1, which is included in a non-aqueous electrolyte solution of the present invention, is a Lewis base-based compound which includes a ring group containing a nitrogen element with unshared electron pairs in its structure, that is, a heteroaryl group, wherein it may remove a by-product, which is generated by decomposition of a lithium salt in the non-aqueous electrolyte solution, by reacting with the by-product. Since the non-aqueous electrolyte solution including the additive may suppress a continuous decomposition reaction of an organic solvent due to the by-product of the lithium salt, and, accordingly, may suppress a collapse phenomenon of a solid electrolyte interphase (SEI) formed on an electrode interface, an SEI having excellent high-temperature durability may be formed on a surface of a negative electrode. Thus, if the non-aqueous electrolyte solution is included, a lithium secondary battery having improved high-temperature storage characteristics and initial capacity may be achieved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Unless otherwise specified in the present invention, the expression "*" denotes the same or different atom or a portion connected between ends of a formula.

Electrolyte Solution for Lithium Secondary Battery

An electrolyte solution for a lithium secondary battery according to the present invention includes: a lithium salt; an additive including a compound represented by the following Formula 1; and an organic solvent.

[Formula 1]

In Formula 1,

R is a substituted or unsubstituted alkylene group having 1 to 5 carbon atoms, and A is a substituted or unsubstituted nitrogen atom-containing heteroaryl group having 3 to 7 carbon atoms.

(1) Lithium Salt

In the present invention, the lithium salt is used as a medium for transferring ions in a lithium secondary battery. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and may preferably include $LiPF_6$ and/or $LiBF_4$, but the present invention is not limited thereto.

Among the lithium salts, $LiPF_6$ and/or $LiBF_4$ are particularly widely used because they generally have high ionic conductivity. However, in a case in which an organic solvent is decomposed at high temperature, a decomposition product of the organic solvent and $PF_6^-$, as an anion of the lithium salt, may react with each other to generate a Lewis acid by-product such as $PF_5$. With respect to the Lewis acid by-product, it promotes a spontaneous decomposition reaction of the organic solvent and causes a side reaction that collapses a solid electrolyte interphase (SEI) formed on an electrode interface. In a case in which the side reaction is not suppressed, resistance in the battery may be rapidly increased, and capacity characteristics of the battery may be degraded.

Specifically, in a case in which $LiPF_6$ is used as the lithium salt, $PF_6^-$, as an anion, may lose electrons on a negative electrode side and $PF_5$ may be formed. In this case, the following chemical reaction may proceed in a chain-wise manner (see Reaction Formula 1 below)

[Reaction Formula 1]

In a case in which the chain reaction is in progress, since other by-products, including HF generated, may cause the decomposition of the organic solvent or the side reaction with the SEI, performance of the battery may be continuously degraded.

(2) Additive

In order to solve the above-mentioned problems in the present invention, an additive including a compound represented by Formula 1 to be described below is used.

Next, the additive including the compound represented by the following Formula 1 will be described.

[Formula 1]

In Formula 1, R is a substituted or unsubstituted alkylene group having 1 to 5 carbon atoms, and A is a substituted or unsubstituted nitrogen atom-containing heteroaryl group having 3 to 7 carbon atoms.

Specifically, A is a substituted or unsubstituted nitrogen atom-containing heteroaryl group having 3 to 5 carbon atoms.

$PF_5$, one of products generated as the lithium salt is decomposed under high temperature conditions, corresponds to a Lewis acid. Thus, it is necessary to remove a Lewis acid compound in order to suppress the decomposition reaction which occurs when the Lewis acid compound, such as $PF_5$, reacts with the organic solvent or components constituting the SEI on the electrode interface.

That is, a Lewis acid is a chemical species that accepts an electron pair, and a Lewis base is a chemical species capable of donating an electron pair, wherein a compound having strong electron-donating characteristics may be used as the Lewis base.

Thus, in the present invention, a compound corresponding to the Lewis base, which may react with the Lewis acid, was used as the additive included in the electrolyte solution.

The compound represented by Formula 1 may include ring A which contains at least one heteroatom and 3 to 7 carbon atoms. Ring A may include at least one double bond.

That is, since ring A in the compound represented by Formula 1 contains a nitrogen element having an unshared electron pair, it provides electrons to the Lewis acid compound such as $PF_5$, and thus, it may remove the $PF_5$ before the $PF_5$ attacks the SEI formed on a negative electrode.

Ring A may have a ring structure derived from imidazole, pyrrole, pyridine, and pyrimidine, but is not necessarily limited to a specific structure.

Since the compound represented by Formula 1 further includes a double bond portion at its end, it may act as one component capable of reacting with an electrode active material to form the SEI when the additive is decomposed. Thus, the compound represented by Formula 1 may further improve high-temperature durability of the battery.

The compound represented by Formula 1 may be included in an amount of 0.001 part by weight to 5 parts by weight, preferably 0.01 part by weight to 5 parts by weight, and more preferably 0.1 part by weight to 5 parts by weight based on 100 parts by weight of the electrolyte solution for a lithium secondary battery. In a case in which the compound represented by Formula 1 is included in an amount within the above range, the compound represented by Formula 1 may undergo a Lewis acid-base reaction with a by-product of the lithium salt to remove the by-product and may minimize those not participating in the reaction to suppress a rather increase in resistance in the battery.

Specifically, the compound represented by Formula 1 may include at least one compound selected from the group consisting of Formulae 1A to 1C below.

[Formula 1A]

In Formula 1A,
$R_1$ is a substituted or unsubstituted alkylene group having 1 to 5 carbon atoms.

[Formula 1B]

In Formula 1B,
$R_2$ is a substituted or unsubstituted alkylene group having 1 to 5 carbon atoms.

[Formula 1C]

In Formula 1C,

R₃ is a substituted or unsubstituted alkylene group having 1 to 5 carbon atoms.

More specifically, the compound represented by Formula 1A may include at least one compound selected from the group consisting of Formulae 1A-1 to 1A-5 below.

[Formula 1A-1]

[Formula 1A-2]

[Formula 1A-3]

[Formula 1A-4]

[Formula 1A-5]

In order to use the compound corresponding to the Lewis base, which may react with the Lewis acid, as the non-aqueous electrolyte solution additive as in the present invention, a pKa value is very important. That is, with respect to compounds of Formulae 2 to 4 below, since pKa values are low at −3.0 or less, it is difficult to act as a Lewis base. Thus, these compounds are not suitable for use as the non-aqueous electrolyte solution additive capable of reacting with the Lewis acid as a decomposition product of the lithium salt.

[Formula 2]

(pKa = −3.07 ± 0.20)

[Formula 3]

(pKa = −3.17 ± 0.20)

[Formula 4]

(pKa = −3.09 ± 0.20)

(3) Organic Solvent

Next, the organic solvent will be described.

In the present invention, the organic solvent is a solvent commonly used in a lithium secondary battery, wherein, for example, an ether compound, an ester compound (acetates and propionates), an amide compound, a linear carbonate or cyclic carbonate compound, or a nitrile compound may be used alone or in mixture of two or more thereof.

Among them, a carbonate-based electrolyte solution solvent containing a carbonate compound which is generally a cyclic carbonate, linear carbonate, or a mixture thereof, may be typically used.

Specific examples of the cyclic carbonate compound may be a single compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more thereof.

Also, specific examples of the linear carbonate compound may be a compound selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof, but the present invention is not limited thereto.

In particular, since propylene carbonate and ethylene carbonate, as cyclic carbonates among the carbonate-based electrolyte solution solvents, are highly viscous organic solvents and have high dielectric constants, the propylene carbonate and ethylene carbonate may well dissociate the lithium salt in the electrolyte solution, and, thus, the propylene carbonate and ethylene carbonate may be preferably used. Since an electrolyte solution having high electrical conductivity may be prepared when the above cyclic carbonate is mixed with low viscosity, low dielectric constant linear carbonate, such as ethylmethyl carbonate, diethyl carbonate, or dimethyl carbonate, in an appropriate ratio, the propylene carbonate and ethylene carbonate may be more preferably used.

Furthermore, as the ester compound among the electrolyte solution solvents, a single compound selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof may be used, but the present invention is not limited thereto.

(4) Additional Additives

In order to prevent the non-aqueous electrolyte solution from being decomposed to cause collapse of the electrode in a high voltage environment, or further improve low-temperature high-rate discharge characteristics, high-temperature stability, overcharge protection, and an effect of suppressing battery swelling at high temperatures, the non-aqueous electrolyte solution included in the lithium secondary battery of the present invention may further include additional additives in the non-aqueous electrolyte solution, if necessary.

As a representative example, the additional additive may include at least one additional additive selected from the group consisting of a cyclic carbonate-based compound, a halogen-substituted carbonate-based compound, a sultone-based compound, a sulfate-based compound, a phosphate-based compound, a phosphite-based compound, a borate-based compound, a nitrile-based compound, an amine-based compound, a silane-based compound, a benzene-based compound, and a lithium salt-based compound.

The cyclic carbonate-based compound may include vinylene carbonate (VC) or vinyl ethylene carbonate, and may specifically include vinylene carbonate.

As described above, it is preferable that the non-aqueous electrolyte solution of the present invention does not include a non-fluorine carbonate-based solvent. Thus, in a case in which the cyclic carbonate-based compound is included as the additive, the cyclic carbonate-based compound may be included in an amount of less than 4 wt %, for example, 0.1 wt % to 3 wt % based on a total weight of the non-aqueous electrolyte solution. If the amount of the cyclic carbonate-based compound is greater than 4 wt %, stability of the lithium secondary battery may be reduced.

The halogen-substituted carbonate-based compound may include fluoroethylene carbonate (FEC).

The sultone-based compound is a material capable of forming a stable SEI on a surface of the negative electrode by a reduction reaction, wherein the sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone, and may specifically include 1,3-propane sultone (PS) or 1,3-propene sultone (PRS).

The sulfate-based compound is a material capable of forming a stable SEI, which does not crack even during high-temperature storage, by being electrically decomposed on the surface of the negative electrode, wherein the sulfate-based compound may include ethylene sulfate (Esa), trimethylene sulfate (TMS), or methyl trimethylene sulfate (MTMS).

The phosphate-based compound or phosphite-based compound may include at least one compound selected from the group consisting of lithium difluoro bis(oxalato)phosphate, lithium difluoro phosphate, tris(trimethylsilyl) phosphate, tris(trimethylsilyl) phosphite, tris(2,2,2-trifluoroethyl)phosphate, and tris(trifluoroethyl)phosphite.

The borate-based compound may include lithium tetraphenylborate and lithium difluoro(oxalato)borate (LiODFB)

The nitrile-based compound may include at least one selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, and may specifically include at least one selected from the group consisting of fluorine-containing 2-fluorobenzonitrile, 4-fluorobenzonitrile, difluorobenzonitrile, and trifluorobenzonitrile.

The amine-based compound may include triethanolamine or ethylene diamine, and the silane-based compound may include tetravinylsilane.

The benzene-based compound may include monofluorobenzene (hereinafter, referred to as "fluorobenzene"), difluorobenzene, trifluorobenzene, or tetrafluorobenzene.

The lithium salt-based compound is a compound different from the lithium salt included in the non-aqueous electrolyte solution, wherein the lithium salt-based compound may include at least one compound selected from the group consisting of lithium difluoro (oxalato) borate ($LiB(C_2O_4)F_2$), lithium oxalyldifluoroborate (LiODFB), lithium bisoxalatoborate ($LiB(C_2O_4)_2$; LiBOB), and lithium tetrafluoroborate ($LiBF_4$).

Two or more of the additional additives may be mixed and used, and the mixed additional additives may be included in an amount of less than 50 wt %, particularly 0.1 wt % to 10 wt %, and preferably 0.05 wt % to 5 wt % based on the total weight of the non-aqueous electrolyte solution. In a case in which the amount of the mixed additional additives is less than 0.1 wt %, an effect of improving low-temperature capacity, high-temperature storage characteristics, and high-temperature life characteristics is insignificant, and, in a case in which the amount of the mixed additional additives is greater than 50 wt %, a side reaction in the electrolyte solution may excessively occur during charge and discharge of the battery. Particularly, if the excessive amount of the additives for forming an SEI is added, the additives for forming an SEI may not be sufficiently decomposed at high temperatures so that the additives may be present in the form of an unreacted material or precipitates in the electrolyte solution at room temperature. Accordingly, a side reaction may occur in which lifetime or resistance characteristics of the secondary battery are degraded.

Lithium Secondary Battery

Next, a lithium secondary battery according to the present invention will be described.

The lithium secondary battery according to an embodiment of the present invention includes at least one positive electrode, at least one negative electrode, a separator which may be optionally disposed between the positive electrode and the negative electrode, and the electrolyte solution for a lithium secondary battery. In this case, since the electrolyte solution for a lithium secondary battery is the same as described above, a detailed description thereof will be omitted.

(1) Positive Electrode

The positive electrode may be prepared by coating a positive electrode collector with a positive electrode active material slurry including a positive electrode active material, a binder for an electrode, an electrode conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In this case, the positive electrode collector may have fine surface roughness to improve bonding strength with the positive electrode active material, and the positive electrode collector may be used in various shapes such as a film, a sheet, a foil, a net, a porous body, a foam body, a non-woven fabric body, and the like.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where 0<Y1<1), $LiMn_{2-Z1}Ni_{Z1}O_4$ (where 0<Z1<2), etc.), lithium-nickel-cobalt-based oxide (e.g., $LiNi_{1-Y2}Co_{Y2}O_2$ (where 0<Y2<1), lithium-manganese-cobalt-based oxide (e.g., $LiCo_{1-Y3}Mn_{Y3}O_2$ (where 0<Y3<1), $LiMn_{2-Z2}Co_{Z2}O_4$ (where 0<Z2<2), etc.), lithium-nickel-manganese-cobalt-based oxide (e.g., $Li(Ni_{p1}Co_{q1}Mn_{r1})O_2$ (where 0<p1<1, 0<q1<1, 0<r1<1, and p1+q1+r1=1) or $Li(Ni_{p2}CO_{q2}Mn_{r2})O_4$ (where 0<p2<2, 0<q2<2, 0<r2<2, and p2+q2+r2=2), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein 0<p3<1, 0<q3<1, 0<r3<1, 0<S1<1, and p3+q3+r3+S1=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The binder for an electrode is a component that assists in the binding between the positive electrode active material and the electrode conductive agent and in the binding with the current collector. Specifically, the binder may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene terpolymer (EPDM), a sulfonated EPDM, a styrene-butadiene rubber, a fluoro rubber, various copolymers thereof, and the like.

The electrode conductive agent is a component for further improving the conductivity of the positive electrode active material. Any electrode conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as optionally the binder for a positive electrode and the positive electrode conductive agent is included.

(2) Negative Electrode

Also, the negative electrode, for example, may be prepared by coating a negative electrode collector with a negative electrode active material slurry including a negative electrode active material, a binder for an electrode, an electrode conductive agent, and a solvent. A metal current collector itself may be used as the negative electrode.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides ($MeO_x$) of the metals (Me); and composites of the metals (Me) and carbon.

Preferably, $SiO_x$ (0<x≤2) may be included as the negative electrode active material. In a case in which a silicon-based negative electrode active material is used as the negative electrode active material, there is a limitation in that the silicon-based negative electrode active material is cracked and finely powdered due to a large volume change accompanied with charge and discharge of lithium. Particularly, with respect to a secondary battery using this negative electrode active material, there was a limitation in that capacity was rapidly reduced and cycle life was shortened as charge and discharge cycles were carried out at high temperatures.

However, in a case in which the electrolyte solution for a lithium secondary battery according to the present invention is used together, properties of the SEI may be modified by a terminal aryl functional group, and the above-described limitations may be improved through this modification.

Since the binder for an electrode, the electrode conductive agent, and the solvent are the same as described above, detailed descriptions thereof will be omitted.

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a polyolefin-based porous polymer film coated with inorganic particles (e.g. $Al_2O_3$) or a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

Example 1

(1) Preparation of Electrolyte Solution for Lithium Secondary Battery

A non-aqueous organic solvent was prepared by mixing ethylene carbonate (EC) and ethyl methyl carbonate (EMC) at a volume ratio of 3:7 and dissolving $LiPF_6$ and LiFSI such that concentrations of the $LiPF_6$ and the LiFSI were 0.7 M and 0.3 M, respectively. 0.5 g of the additive represented by Formula 1A-1, 0.1 g of tetravinylsilane, 1.0 g of lithium difluorophosphate, 1.0 g of ethylene sulfonate, 0.5 g of 1,3-propane sultone, 0.2 g of $LiBF_4$, and 6.0 g of fluorobenzene were added to 90.7 g of the non-aqueous organic solvent to prepare an electrolyte solution for a lithium secondary battery.

(2) Lithium Secondary Battery Preparation

A positive electrode active material ($Li(Ni_{0.8}Co_{0.1}Mn_{0.1})O_2$ (NCM811):$LiNi_{0.6}Co_{0.2}Mn_{0.2}O_2$=70:30 weight ratio), carbon black as a conductive agent, and polyvinylidene fluoride (PVDF), as a binder, were mixed in a weight ratio of 97.5:1:1.5 and then added to N-methyl-2-pyrrolidone (NMP), as a solvent, to prepare a positive electrode active material slurry (solid content: 50 wt %). A 12 μm thick aluminum (Al) thin film, as a positive electrode collector, was coated with the positive electrode active material slurry, dried, and roll-pressed to prepare a positive electrode.

A negative electrode active material (SiO:graphite=5:95 weight ratio), carbon black as a conductive agent, and styrene-butadiene rubber-carboxymethylcellulose (SBR-CMC), as a binder, were mixed in a weight ratio of 95:1.5:3.5 and then added to water, as a solvent, to prepare a negative electrode active material slurry (solid content: 60 wt %). A 6 μm thick copper (Cu) thin film, as a negative electrode collector, was coated with the negative electrode active material slurry, dried, and roll-pressed to prepare a negative electrode.

An electrode assembly was prepared by sequentially stacking the positive electrode, a polyolefin-based porous separator coated with inorganic particles ($Al_2O_3$), and the negative electrode. Thereafter, the electrode assembly was accommodated in a pouch-type battery case, and the electrolyte solution for a lithium secondary battery was injected thereinto to prepare a pouch-type lithium secondary battery.

Example 2

(1) Preparation of Electrolyte Solution for Lithium Secondary Battery

A non-aqueous organic solvent was prepared by mixing ethylene carbonate (EC) and ethyl methyl carbonate (EMC) at a volume ratio of 3:7 and dissolving $LiPF_6$ and LiFSI such that concentrations of the $LiPF_6$ and the LiFSI were 0.7 M and 0.3 M, respectively. 0.2 g of the additive represented by Formula 1A-1, 0.1 g of tetravinylsilane, 1.0 g of lithium difluorophosphate, 1.0 g of ethylene sulfonate, 0.5 g of 1,3-propane sultone, 0.2 g of $LiBF_4$, and 6.0 g of fluorobenzene were added to 91 g of the non-aqueous organic solvent to prepare an electrolyte solution for a lithium secondary battery.

(2) lithium Secondary Battery Preparation

A positive electrode active material ($Li(Ni_{0.8}Co_{0.1}Mn_{0.1})O_2$ (NCM811)), carbon black as a conductive agent, and polyvinylidene fluoride (PVDF), as a binder, were mixed in a weight ratio of 97.5:1:1.5 and then added to N-methyl-2-pyrrolidone (NMP), as a solvent, to prepare a positive electrode active material slurry (solid content: 50 wt %). A 12 μm thick aluminum (Al) thin film, as a positive electrode collector, was coated with the positive electrode active material slurry, dried, and roll-pressed to prepare a positive electrode.

A pouch-type lithium secondary battery was prepared in the same manner as in Example 1 except that the above-prepared electrolyte solution for a lithium secondary battery and positive electrode were used.

Comparative Examples

Comparative Example 1

A lithium secondary battery was prepared in the same manner as in Example 1 except that 0.1 g of tetravinylsilane, 1.0 g of lithium difluorophosphate, 1.0 g of ethylene sulfonate, 0.5 g of 1,3-propane sultone, 0.2 g of $LiBF_4$, and 6.0 g of fluorobenzene were added to 91.2 g of the non-aqueous organic solvent to prepare an electrolyte solution for a lithium secondary battery.

Comparative Example 2

A lithium secondary battery was prepared in the same manner as in Example 2 except that the electrolyte solution for a lithium secondary battery of Comparative Example 1 was used.

Experimental Examples

Experimental Example 1: High-Temperature (60° C.) Storage Characteristics Evaluation (1)

After each of the lithium secondary batteries prepared in Example 1 and Comparative Example 1 was activated at a CC of 0.1 C, degas was performed.

Subsequently, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging and discharging were defined as one cycle, and, after one cycle was performed, residual capacity was measured using PNE-0506 charge/discharge equipment (manufacturer: PNE SOLUTION Co., Ltd., 5 V, 6 A) (initial residual capacity).

Then, after each lithium secondary battery was recharged at a CC of 0.33 C to a state of charge (SOC) of 100% and then further stored at a high temperature (60° C.) for 2 weeks, CC-CV charge and discharge were performed at a CC of 0.33 C, and residual capacity was then measured using PNE-0506 charge/discharge equipment (manufacturer: PNE SOLUTION Co., Ltd., 5 V, 6 A) (2 weeks residual capacity).

Then, after each lithium secondary battery was recharged at a CC of 0.33 C to a state of charge (SOC) of 100% and then further stored at a high temperature (60° C.) for 4 weeks, CC-CV charge and discharge were performed at a CC of 0.33 C, and residual capacity was then measured using PNE-0506 charge/discharge equipment (manufacturer: PNE SOLUTION Co., Ltd., 5 V, 6 A) (4 weeks residual capacity).

Figure 1:
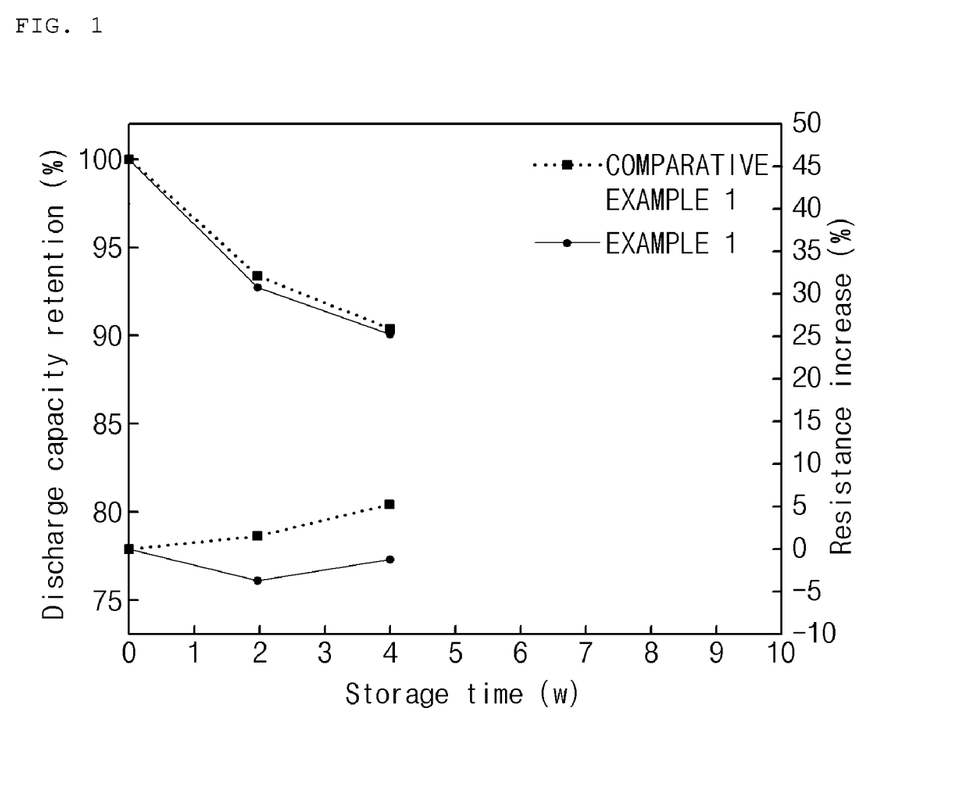
FIG. 1 is a graph illustrating capacity change rates and resistance increase rates of lithium secondary batteries according to Experimental Example 1.

The initial residual capacity and the residual capacities of the secondary batteries measured after 2 weeks and 4 weeks are presented in FIG. 1.

Also, after each of the lithium secondary batteries, in which the initial residual capacity and the 2 weeks and 4 weeks residual capacities were measured, was charged to a state of charge (SOC) of 50%, DC-iR was calculated by a voltage drop obtained in a state in which each of the lithium secondary batteries was subjected to a discharge pulse at 2.5 C for 10 seconds, the DC-iR was substituted into the following [Equation 1] to calculate a resistance increase rate (%), and the results thereof are presented in FIG. 1. In this case, the voltage drop was measured using PNE-0506 charge/discharge equipment (manufacturer: PNE SOLUTION Co., Ltd., 5 V, 6 A).

Resistance increase rate (%)={(resistance after high-temperature storage-initial resistance)/initial resistance}×100      [Equation 1]

Referring to FIG. 1, rates of change of the residual capacities of the secondary batteries after high-temperature storage for 4 weeks were similar, but, with respect to the secondary battery of Example 1, it may be confirmed that the resistance increase rate was significantly reduced in comparison to that of the secondary battery of Comparative Example 1.

Experimental Example 2: High-Temperature (60° C.) Storage Characteristics Evaluation (2)

After each of the lithium secondary batteries prepared in Example 2 and Comparative Example 2 was activated at a CC of 0.1 C, degas was performed.

Thereafter, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V. The above charging and discharging were defined as one cycle, and, after one cycle was performed, residual capacity was measured using PNE-0506 charge/discharge equipment (manufacturer: PNE SOLUTION Co., Ltd., 5 V, 6 A) (initial residual capacity).

Next, after each lithium secondary battery was recharged at a CC of 0.33 C to a state of charge (SOC) of 100% and then further stored at a high temperature (60° C.) for 2 weeks, CC-CV charge and discharge were performed at a CC of 0.33 C, and residual capacity was then measured using PNE-0506 charge/discharge equipment (manufacturer: PNE SOLUTION Co., Ltd., 5 V, 6 A) (2 weeks residual capacity).

Then, after each lithium secondary battery was recharged at a CC of 0.33 C to a state of charge (SOC) of 100% and then further stored at a high temperature (60° C.) for 2 weeks, CC-CV charge and discharge were performed at a CC of 0.33 C, and residual capacity was then measured using PNE-0506 charge/discharge equipment (manufacturer: PNE SOLUTION Co., Ltd., 5 V, 6 A) (total 4 weeks residual capacity).

Then, after each lithium secondary battery was recharged at a CC of 0.33 C to a state of charge (SOC) of 100% and then further stored at a high temperature (60° C.) for 3 weeks, CC-CV charge and discharge were performed at a CC of 0.33 C, and residual capacity was then measured using PNE-0506 charge/discharge equipment (manufacturer: PNE SOLUTION Co., Ltd., 5 V, 6 A) (total 7 weeks residual capacity).

The residual capacities of the secondary batteries measured after 2 weeks, 4 weeks, and 7 weeks are presented in Table 1 below.

Then, after each of the lithium secondary batteries stored for 2 weeks, 4 weeks, and 7 weeks was charged to a state of charge (SOC) of 50%, DC-iR was calculated by a voltage drop obtained in a state in which each of the lithium secondary batteries was subjected to a discharge pulse at 2.5 C for 10 seconds, the DC-iR was substituted into [Equation 1] to calculate a resistance increase rate (%), and the results thereof are presented in Table 1. In this case, the voltage drop was measured using PNE-0506 charge/discharge equipment (manufacturer: PNE SOLUTION Co., Ltd., 5 V, 6 A).

TABLE 1

|  | 60° C. storage capacity retention | | | 60° C. resistance increase rate |
| --- | --- | --- | --- | --- |
|  | 2 weeks | 4 weeks | 7 weeks | 4 weeks |
| Comparative Example 2 | 92.0 | 88.9 | 86.1 | 16.4 |
| Example 2 | 92.1 | 89.0 | 86.2 | 8.1 |

Referring to Table 1, rates of change of the residual capacities of the secondary batteries of Example 2 and Comparative Example 2 after high-temperature storage for 7 weeks were similar, but it may be confirmed that the resistance increase rate of the secondary battery of Example 2 was significantly reduced in comparison to that of the secondary battery of Comparative Example 2.

Experimental Example 3. High-Temperature (45° C.) Life Characteristics Evaluation After each of the lithium secondary batteries prepared in Example 1 and Comparative Example 1 was activated at a CC of 0.1 C, degas was performed. Thereafter, each lithium secondary battery was charged at a CC of 0.33 C to 4.20 V under a constant current-constant voltage (CC-CV) condition at 25° C., then subjected to 0.05 C current cut-off, and discharged at a CC of 0.33 C to 2.5 V.

Next, each lithium secondary battery was charged at 0.33 C rate under a CC condition to 4.20 V under a constant current-constant voltage (CC-CV) condition at 45° C., then subjected to 0.05 C current cut-off, and discharged at 0.33 C under a CC condition to 2.5 V. The above charging and discharging were defined as one cycle, and 100 cycles were repeated at a high temperature (45° C.).

In this case, after discharge capacity after one cycle (initial discharge capacity) and discharge capacity after 100 cycles were respectively measured using PNE-0506 charge/discharge equipment (manufacturer: PNE SOLUTION Co., Ltd., 5 V, 6 A), these discharge capacities were substituted into the following [Equation 2] to calculate discharge capacity retention, and the results thereof are presented in FIG. 2.

Figure 2:
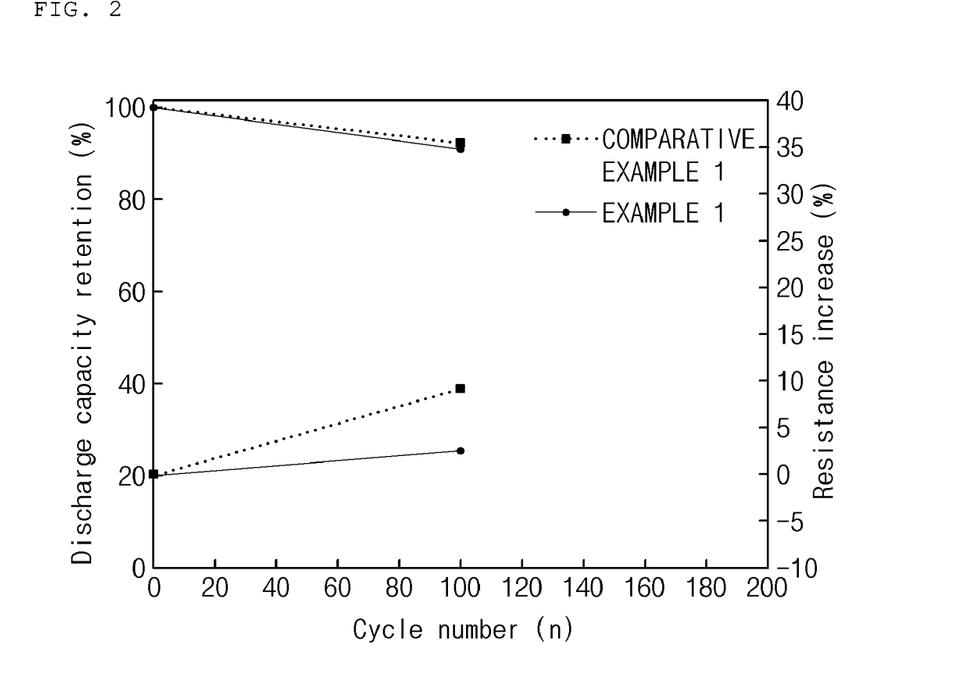
FIG. 2 is a graph illustrating capacity change rates and resistance increase rates of lithium secondary batteries according to Experimental Example 3.

Discharge capacity retention (%)=(discharge capacity after 100 cycles/initial discharge capacity)×100 [Equation 2]

After each lithium secondary battery was charged to a state of charge (SOC) of 50% after one cycle, resistance was measured (initial resistance measurement). Thereafter, direct current internal resistance (hereinafter, referred to as "DC-iR") was calculated by a voltage drop obtained in a state in which each lithium secondary battery was subjected to a discharge pulse at 2.5 C for 10 seconds, resistance measured after 100 cycles (resistance after 100 cycles) was substituted into the following [Equation 3] to calculate a resistance increase rate (%), and the results thereof are also presented in FIG. 2. In this case, the voltage drop was measured using PNE-0506 charge/discharge equipment (manufacturer: PNE SOLUTION Co., Ltd., 5 V, 6 A).

Resistance increase rate (%)={(resistance after 100 cycles-initial resistance)/initial resistance}×100 [Equation 3]

Referring to FIG. 2, with respect to the lithium secondary battery of Example 1, since a stable film was formed on the surfaces of the positive electrode/negative electrode, the discharge capacity retention was similar when long-term charge and discharge at high temperature was performed, but it may be confirmed that the resistance increase rate was significantly reduced in comparison to that of the lithium secondary battery of Comparative Example 1 due to the suppression of additional electrolyte solution decomposition.

Experimental Example 4: Initial Capacity Evaluation

After each of the lithium secondary batteries prepared in Example 1 and Comparative Example 1 was activated at 0.1 C under a CC condition, each lithium secondary battery was charged at 0.33 C under a CC condition to 4.20 V under a constant current-constant voltage (CC-CV) condition at 25° C., then subjected to 0.05 C current cut-off, and discharged at 0.33 C under a CC condition to 2.5 V.

Figure 3:
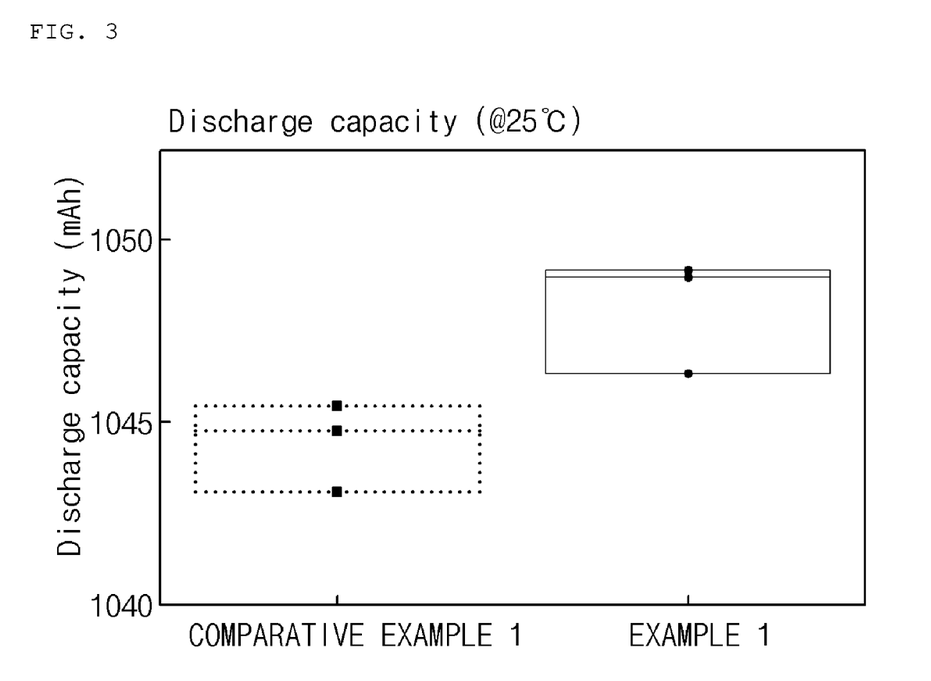
FIG. 3 is a graph illustrating initial capacities of lithium secondary batteries according to Experimental Example 4.

Discharge capacity (=initial capacity), after the above charging and discharging were set as one cycle and 3 cycles were performed, was measured and presented in FIG. 3.

Referring to FIG. 3, it may be confirmed that the initial capacity of the lithium secondary battery of Example 1 was higher than that of the lithium secondary battery of Comparative Example 1.

Experimental Example 5: Characteristics Evaluation of SEI on Negative Electrode

After each of the lithium secondary batteries prepared in Example 1 and Comparative Example 1 was CC-CV charged at 0.1 C to 4.2 V to be activated with 0.05 C cut-off, degas was performed.

Thereafter, capacity was measured using PNE-0506 charge/discharge equipment (manufacturer: PNE SOLUTION Co., Ltd., 5 V, 6 A), and a differential capacity-voltage curve, which was obtained by performing the first derivative of a capacity-voltage curve thus obtained, was illustrated in FIG. 4.

Figure 4:
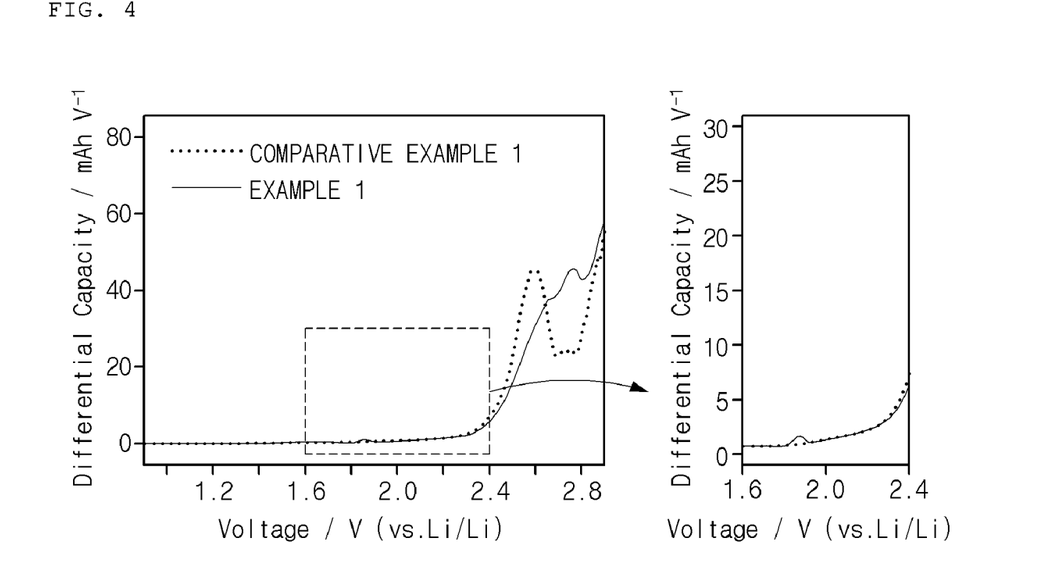
FIG. 4 is a graph illustrating differential capacity-voltage curves of lithium secondary batteries according to Experimental Example 5.

Referring to FIG. 4, since the lithium secondary battery of Example 1 included the additive represented by Formula 1A-1, a decomposition reaction proceeded initially, and thus, a decomposition peak was observed between 1.8 V and 2.0 V. Thus, according to the observed peak, it may be confirmed that an SEI with a new component was further formed on the surface of the negative electrode due to the additive decomposition. Accordingly, it may be confirmed that an additional stable SEI was further formed on the negative electrode in addition to the existing SEI.

The invention claimed is:

1. An electrolyte solution for a lithium secondary battery, the electrolyte solution comprising:
a lithium salt;
an additive including a compound represented by Formula 1A-1; and
an organic solvent:

[Formula 1A-1]

2. The electrolyte solution for a lithium secondary battery of claim 1, wherein the lithium salt comprises at least one of $LiPF_6$ or $LiBF_4$.

3. The electrolyte solution for a lithium secondary battery of claim 1, wherein the compound represented by Formula 1 is present in an amount of 0.001 part by weight to 5 parts by weight, based on 100 parts by weight of the electrolyte solution.

4. The electrolyte solution for a lithium secondary battery of claim 1, wherein the compound represented by Formula 1 is present in an amount of 0.01 part by weight to 5 parts by weight, based on 100 parts by weight of the electrolyte solution.

5. The electrolyte solution for a lithium secondary battery of claim 1, further comprising at least one additional additive of a cyclic carbonate-based compound, a halogen-substituted carbonate-based compound, a sultone-based compound, a sulfate-based compound, a phosphate-based compound, a borate-based compound, a nitrile-based compound, an amine-based compound, a silane-based compound, a benzene-based compound, or a lithium salt-based compound.

6. The electrolyte solution for a lithium secondary battery of claim 5, wherein the additional additive comprises at least one of vinylene carbonate, vinyl ethylene carbonate, fluoroethylene carbonate, 1,3-propane sultone (PS), 1,4-butane sultone, ethane sultone, 1,3-propene sultone, 1,4-butene sultone, 1-methyl-1,3-propene sultone, ethylene sulfate, trimethylene sulfate, methyl trimethylene sulfate, lithium difluoro bis(oxalato) phosphate, lithium difluoro phosphate, tris(trimethylsilyl) phosphate, tris(trimethylsilyl) phosphite, tris(2,2,2-trifluoroethyl) phosphate, tris(trifluoroethyl) phosphite, lithium tetraphenylborate, lithium difluoro (oxalato) borate, succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, triethanolamine, ethylene diamine, tetravinylsilane, monofluorobenzene, difluorobenzene, trifluorobenzene, tetrafluorobenzene, lithium difluoro (oxalato) borate, lithium oxalyldifluoroborate, lithium bisoxalatoborate, or lithium tetrafluoroborate.

7. A lithium secondary battery, comprising:
a positive electrode;
a negative electrode which includes a negative electrode active material containing $SiO_x$, where $0<x\leq 2$;
a separator; and
the electrolyte solution of claim 1.

* * * * *